Sept. 1, 1959  R. J. POWELL ET AL  2,902,016
FUEL INJECTION SYSTEM
Filed June 10, 1957  2 Sheets-Sheet 1

INVENTOR.
Robert J. Powell
James E. Champion
BY
Hauke & Hardity
ATTORNEYS

Sept. 1, 1959     R. J. POWELL ET AL     2,902,016
FUEL INJECTION SYSTEM
Filed June 10, 1957                                  2 Sheets-Sheet 2
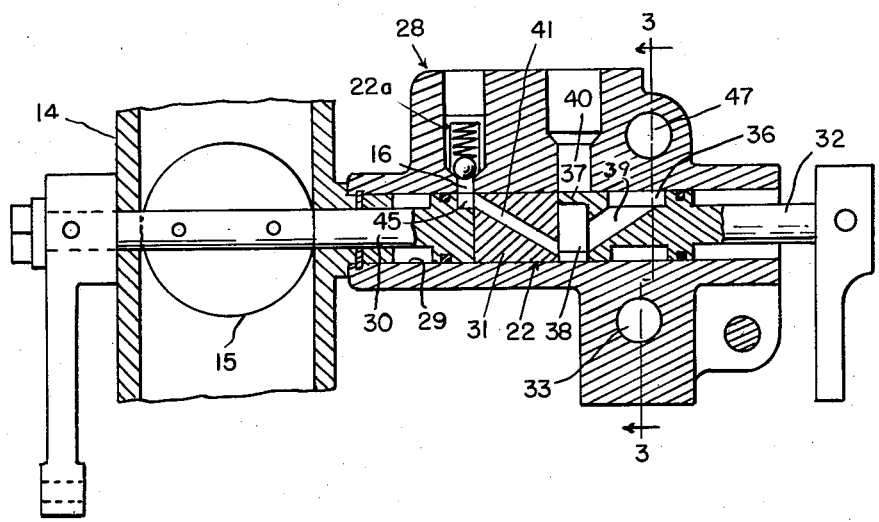
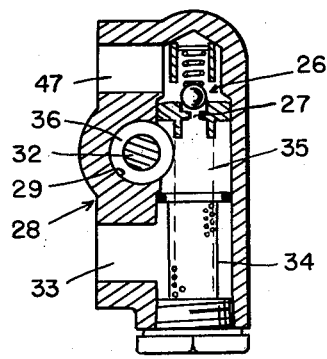
INVENTOR.
Robert J. Powell
James E. Champion
BY
Hauker & Hardesty
ATTORNEYS

2,902,016
Patented Sept. 1, 1959

2,902,016

FUEL INJECTION SYSTEM

Robert J. Powell and James E. Champion, Muskegon, Mich., assignors to Continental Motors Corporation, Detroit and Muskegon, Mich., a corporation of Virginia Application June 10, 1957, Serial No. 664,856

11 Claims. (Cl. 123—139)

This invention relates to fuel injection systems for internal combustion engines, and more particularly to a multi-nozzle, continuous flow fuel injection system preferably adapted for use in internal combustion engines of the aircraft multi-cylinder type.

Continuous flow fuel injection systems are desirable for aircraft engines because of the relative simplicity of construction and operation and the fact that such systems reduce icing. However, such systems heretofore have failed to meet the requirements desired for efficient and reliable performance under varying engine operating conditions without a corresponding increase in complexity. A system having the injection nozzles opening into the induction air intake at each cylinder are generally difficult to operate properly at idle since the decreased manifold pressure tends to draw the fuel from the pipes leading thereto. Then, upon advancing the throttle, fuel is not immediately available at sufficient pressure to ensure required engine response. Utilization of complex controls and nozzles only increases the cost of the system and develops a need for frequent servicing.

An object of the present invention is to provide a simplified fuel injection system for internal combustion engines by constructing a continuous-flow multi nozzle system having a minimum of moving parts and capable of injecting the required fuel into the air intake for each engine cylinder under varying operating conditions.

Another object of the invention is to improve performance of a continuous flow fuel injection system for internal combustion engines by providing a novel and simplified injection nozzle at the air induction intake of each engine cylinder, said nozzle being so vented to the atmosphere as to prevent low manifold pressures from drawing fuel out of the nozzle opening.

A further object of the invention is to improve the performance of a continuous fuel injection system for internal combustion engines by constructing an atmosphere vented fuel injection nozzle at the air induction intake of each engine cylinder and operable to produce a jet siphon effect of air by the fuel stream prior to injection for augmentation of fuel vaporization.

For a more complete understanding of the present invention, reference may be had to the accompanying drawings illustrating a referred embodiment of the invention in which like characters refer to like parts throughout the several views and in which part Fig. 1 is a schematic representation of a multi-discharge continuous flow fuel injection system embodying a preferred concept of the invention.

Fig. 2 is a cross sectional view through the metering valve and throttle of Fig. 1.

Fig. 3 is a section taken on the line 3—3 of Fig. 2.

Figure 1:
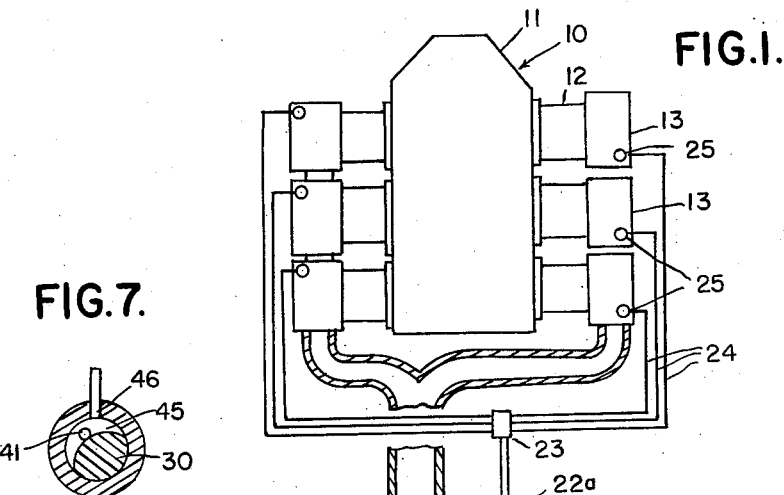

In Fig. 1 is a preferred type of continuous-flow, multiple-discharge fuel injection system is diagrammatically illustrated for use with a multi-cylinder internal combustion engine 10 having a crankcase 11 and engine cylinder 12. Such cylinder has an air intake 13 to which induction air is supplied through an air intake manifold structure 14 provided with an adjustable throttle valve 15.

The fuel injection system comprises a positive displacement fuel pump 20 having a delivery capacity of approximately four times the maximum requirements of the engine 10. The engine for which the instant invention is developed utilizes a maximum of approximately 150 pounds per hour, necessitating the pump delivery of approximately 600 pounds per hour maximum. A fuel tank 21 supplies fuel to the pump 20, which delivers to a fuel metering valve 22. The metering valve 22 is operably connected to the throttle valve 15 so that when the throttle valve is advanced or opened, the metering valve 22 opens correspondingly to port the fuel past a check valve 22a into a fuel delivery manifold 23.

Since the fuel delivery of the pump 20 is in excess of engine requirements, a relief valve 26 and a restricted orifice 27 of predetermined size are provided between th pump 20 and the metering valve 22. The orifice 27 is in series with and preferably located upstream of the relief valve 26. The adjustment of the relief valve and the size of the orifice are dependent upon fuel pump capacity and engine requirements and are provided to control the amount of fuel reciprocated to the fuel pump inlet, thereby regulating the fuel delivery pressure to the metering valve in relation to engine speed.

Figure 4:
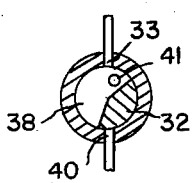
Figs. 4, 5 and 6 are sections taken on the line 4—4 of Fig. 1 and representing various operating positions of the metering valve for mixture control.

Referring particularly to Figs. 2 and 3, the metering valve 22, check valve 22a, and relief valve 26 and orifice 27 are preferably the component parts of a unitary fuel injection control assembly 28. The control assembly 28 is preferably secured adjacent the air intake manifold structure 14. The control assembly has a longitudinal bore 29 in which the components of the metering valve 22 are installed. These parts include a throttle valve shaft 30, a porting member 31, and a mixture control shaft 32. Fuel enters an inlet port 33, passes through a fuel screen 34 into passage 35, and then into an annular passage 36 around the shaft 32. The shaft 32 has a cutaway end face 37 providing a chamber 38 between the shaft 32 and the porting member 31. A passage 39 in the shaft 32 communicates the annular passage 36 with this chamber 38. A fuel bypass port 40 is provided in the control assembly 28, which is selectively opened to the chamber 38 upon rotation of the shaft 32 and is suitably connected to the inlet side of the fuel pump 20, as shown in Fig. 1. Rotation of shaft 32 also selectively closes a passage 41 bored through the porting member 31. The operating function of the shaft 32 is illustrated diagrammatically in Figs. 4, 5 and 6. In Fig. 4, the normal operating position is shown, wherein the port 40 is blocked and the passage 41 is open to the chamber 38, permitting full fuel flow through the passage 41.

Figure 5:
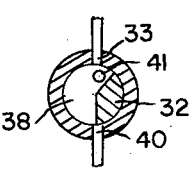
Figure 6:
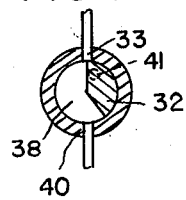

In Fig. 5, the bypass position is shown, the shaft 32 having been partially rotated to selectively open the port 40, resulting in a leaner fuel delivery due to the bypass of at least a part of the fuel to the inlet side of the pump 20. This adjustment is utilized during high altitude operation of the engine. Fig. 6 illustrates the idle cut-off position of the shaft 22, in which the passage 41 is blocked and the fuel is completely bypassed through the port 40.

Figure 7:
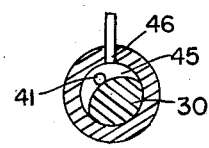
Fig. 7 is a section taken on line 7—7 of Fig. 1.

The end face of the shaft 30 abuts the porting member 31 and is provided with an eccentric arcuate groove 45, which is utilized for selectively opening the passage 41 as the shaft 30 is rotated upon opening of the throttle valve 15. The control assembly 28 is provided with a fuel discharge port 46 which communicates with the arcuate groove 45 in the shaft 30. Fuel from the passage 41 will flow through the port 46 through the check valve 22a and then to the fuel delivery manifold 23. The full throttle position of the shaft 30 is shown in Fig. 7, the arcuate groove 45 positioned so that passage 41 is appreciably fully opened.

The relief valve 26 is preferably constructed as an integral part of the control assembly 28, and is shown in cross-section in Fig. 3 as communicating with the passage 35. Since the fuel pump delivery is always greater than engine requirements, the relief valve 26 will be continuously open, permitting excess fuel to pass out a port 47 to the fuel pump inlet and maintaining a minimum fuel delivery pressure. The control orifice 27 preferably located intermediate the passage 35 and the relief valve 26 is provided to set up a resistance to increased fuel flow in response to any increased engine speed increasing fuel delivery pressure and fuel output through the fuel discharge port 46 when there is no change in the regulated outlet area of passage 41.

Figure 8:
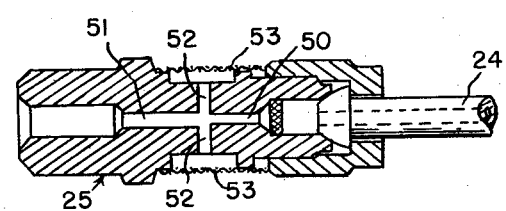
Fig. 8 is a cross sectional view of the invention nozzle used in the system.

From the fuel delivery manifold 23, fuel passes through the branch conduits 24 to the fuel injector nozzles 25. A preferred construction of a nozzle 25 is illustrated in Fig. 8 as having a jet intake duct 50 and a cylinder intake port discharge passage 51 preferably about four times the cross sectional area of the duct 50 and being relatively long, preferably at least six to twelve times the diameter. One or more air intake ports 52 communicate the junction of the duct 50 and the passage 51 with atmosphere, and the total cross-sectional area of these ports 52 is preferably about four times the cross-sectional area of the passage 51. The duct 50 and passage 51 are also axially aligned and the air intake ports 52 preferably are normal to the line of the duct 50 and passage 51. Screen 53 is provided for the air intake ports 52 to exclude foreign material.

During engine idle operation, with low manifold pressures on the order of about 12" Hg, and fuel flow reduced to a minimum, admission of air into passages 52 at substantially atmospheric pressure supplies part of the idle air requirements of the engine. Inasmuch as the air from through passages 52 can more than satisfy demand of passage 51, passage 50 remains at substantially atmospheric pressure, thus preventing the low manifold pressure from causing a boiling effect in the fuel lines or from drawing excess fuel into the cylinders. As engine power and manifold pressure are increased, fuel delivery is also increased. The moment fuel velocity from passage 50 exceeds the free velocity in passage 51, the fuel injected into passage 51 produces a jet siphon effect, drawing in more air through ports 52, due to a suction formed by the fuel passing from passage 50 into passage 51. This reduction of pressure drawing in air produces an atomization of the fuel prior to injection into the engine air induction manifold. In effect, a supercharging occurs, augmenting air flow and facilitating easier and more rapid vaporization than is possible where fuel is injected directly in a stream into the manifold. As engine speed increases, a progressive increase in the supercharging effect is provided through an increase in the working force of the higher fuel flow adds progressively more air. The cross-sectional area of the discharge passage 51 is less than that which will supply all the idle air requirements of the engine, so as not to upset the normal functioning of the air induction system. The various cross-sectional areas of the fuel intake duct 50, discharge passage 51, and air intake port 52 and the minimum 6 to 1 length to diameter ratio of the passage 51 are predetermined by the size and requirements of the particular engine with which the nozzles are used.

Although we have described but one embodiment of the invention, it will be apparent to those skilled in the art to which the invention pertains that various changes and modifications may be made therein without departing from the spirit of the invention or the scope of the appended claims.

This application is a continuation-in-part of our previous application filed February 20, 1956, Serial No. 566,536, now abandoned.

We claim:

1. A continuous flow fuel injection system for a multi-cylinder internal combustion engine having an air intake for each cylinder and an air induction system having an air intake manifold structure provided with an adjustable air intake throttle valve and connected with said cylinder air intake, said injection system comprising a fuel pump having an inlet and an outlet, a fuel supply source connected with said fuel pump inlet, a fuel metering valve structure having a regulatable fuel discharge port and a fuel inlet connected with said fuel pump outlet, and having a fuel pressure relief valve connected with the fuel metering valve inlet and said fuel supply source and operable to maintain a minimum fuel pressure at the said fuel metering valve inlet, and a fuel jet restricted orifice of a fixed predetermined cross-sectional area arranged in series with said fuel pressure relief valve to set up resistance to increased fuel discharge through said relief valve on increase of fuel flow in response to increased engine speed while fuel discharge port area remains substantially constant, means adjusting said metering valve discharge port and connected with the said adjustable air intake throttle valve, a fuel delivery conduit structure connected with said metering valve discharge port and having branch conduits, and a fuel nozzle connected with each branch conduit and with a cylinder air intake, each of said fuel nozzles comprising a coupling structure having a fuel jet intake duct, a cylinder intake port discharge passage of greater cross-sectional area than said fuel jet intake duct, and air inlet means open to atmosphere and connected with said intake port discharge passage and having a greater cross-sectional area than said intake port discharge passage.

2. A continuous flow fuel injection system for a multi-cylinder internal combustion engine having an air intake for each cylinder and an air induction system having an air intake manifold structure provided with an adjustable air intake throttle valve and connected with said cylinder air intake, said injection system comprising a fuel pump having an inlet and an outlet, a fuel supply source connected with said fuel pump inlet, a fuel metering valve structure having a regulatable fuel discharge port and a fuel inlet connected with said fuel pump outlet and having a fuel pressure relief valve connected with the fuel metering valve inlet and said fuel supply source and operable to maintain minimum fuel pressure at the said fuel metering valve inlet, and a fuel jet restricted orifice of a fixed predetermined cross-sectional area disposed in series with said fuel relief valve to set up resistance to increased fuel discharge through said relief valve on increase of fuel flow in response to increased engine speed while fuel discharge port area remains substantially constant, means adjusting said metering valve discharge port and connected with the said adjustable air intake throttle valve, a fuel delivery conduit structure connected with said metering valve discharge port and having branch conduits, and a fuel nozzle connected with each branch conduit and with a cylinder air intake, each of said fuel nozzles comprising a coupling structure having a fuel jet intake duct, a cylinder intake port discharge passage of greater cross-sectional area than said fuel jet inlet duct, and air intake means open to atmosphere and connected with said intake port discharge passage, said intake port discharge passage having a cross-sectional area less than that which would supply from said air inlet means all of the idle air requirements of said engine.

3. A continuous flow fuel injection system for a multi-cylinder internal combustion engine having an air intake for each cylinder and an air induction system having an air intake manifold structure provided with an adjustable air intake throttle valve and connected with said cylinder air intake, said injection system comprising a fuel pump having an inlet and an outlet, a fuel supply source connected with said fuel pump inlet, a fuel metering valve structure having a regulatable fuel discharge port and a fuel inlet connected with said fuel pump outlet, adjusting means connected with said adjustable air intake throttle valve and with said metering valve and operable to simultaneously adjust the throttle valve and the fuel discharge port, a fuel delivery conduit structure connected with said metering valve discharge port and having branch conduits, a fuel nozzle connecting each branch conduit with a cylinder air intake, each of said fuel nozzles comprising a coupling structure having a fuel jet intake duct, a cylinder intake port discharge passage of greater cross-sectional area than said fuel jet intake duct, and an air inlet means open to atmosphere and connected with said intake port discharge passage and having a greater cross-sectional area than said intake port discharge passage, said intake port discharge passage being constructed of a length operable to produce substantially complete atomization of fuel therein prior to injection into said air induction manifold by reason of siphoning of air from said air inlet means by the fuel flow from the fuel jet intake duct directly into said intake port discharge passage at engine speeds above engine idling operation.

4. A continuous flow fuel injection system for a multi-cylinder internal combustion engine having an air intake for each cylinder and an air induction system having an air intake manifold structure provided with an adjustable air intake throttle valve and connected with said cylinder air intake, said injection system comprising a fuel pump having an inlet and an outlet, a fuel supply source connected with said fuel pump inlet, a fuel metering valve structure having a regulatable fuel discharge port and a fuel inlet connected with said fuel pump outlet, adjusting means connected with said adjustable air intake throttle valve and with said metering valve and operable to simultaneously adjust the throttle valve and the fuel discharge port, a fuel delivery conduit structure connected with said metering valve discharge port and having branch conduits, a fuel nozzle connecting each branch conduit with a cylinder air intake, each of said fuel nozzles comprising a coupling structure having a fuel jet intake duct, a cylinder intake port discharge passage of greater cross-sectional area than said fuel jet intake duct, and an air inlet means open to atmosphere and connected with said intake port discharge passage and having a greater cross-sectional area than said intake port discharge passage, said intake port discharge passage being constructed of a length operable to produce substantially complete atomization of fuel therein prior to injection into said air induction manifold by reason of siphoning of air from said air inlet means by the fuel flow from the fuel jet intake directly into said intake port discharge passage at engine speeds above engine idling operation, and a second adjustable means operably connected only to said metering valve and operable to regulate the flow of fuel through said fuel discharge port of said metering valve independently of the adjustment of said throttle valve and said first mentioned metering valve discharge port to provide for variations of fuel discharge when the throttle and discharge port adjustments are constant.

5. In a continuous flow fuel injection system for a multi-cylinder internal combustion engine having an air induction manifold structure for conducting air to each engine cylinder, an adjustable air intake throttle valve for said air induction manifold structure, a fuel metering valve structure simultaneously operating said throttle and said metering valve, a source of fuel supply, a fuel pump having an inlet connected with said fuel source and an outlet connected with said metering valve structure, a fuel delivery system connected with said fuel metering valve structure and comprising branch ducts respectively connected with each of said engine cylinder air intakes, an injector nozzle for each of said branch ducts and comprising a coupling structure having a fuel jet intake duct and a discharge passage opening into said engine cylinder air intake, and air inlet means connecting said discharge passage of said nozzle atmosphere, said intake port discharge passage being constructed of a length operable to produce substantially complete atomization of fuel therein prior to injection into said air induction manifold by reason of siphoning of air from said air inlet means by the fuel flow from the fuel jet intake duct directly into said intake port discharge passage at engine speeds above engine idling operation.

6. In a continuous flow fuel injection system for a multi-cylinder internal combustion engine having an air induction manifold structure for conducting air to each engine cylinder, an adjustable air intake throttle valve for said air induction manifold structure, a fuel metering valve structure means connecting and simultaneously operating said throttle and said metering valve, a source of fuel supply, a fuel pump having an inlet connected with said fuel source and an outlet connected with said metering valve structure, a fuel delivery system connected with said fuel metering valve structure and comprising branch ducts respectively connected with each of said engine cylinder air intakes, an injector nozzle for each of said branch ducts and comprising a coupling structure having a fuel jet intake duct and a discharge passage opening into said engine cylinder air intake, and air inlet means connecting said discharge passage of said nozzle with atmosphere, said air inlet means of said nozzle being greater in cross-sectional area than said discharge passage, said discharge passage being greater in cross-sectional area than said fuel jet intake duct, said intake port discharge passage being constructed of a length operable to produce substantially complete atomization of fuel therein prior to injection into said air induction manifold by reason of siphoning of air from said air inlet means by the fuel flow from the fuel jet intake directly into said intake port discharge passage at engine speeds above engine idling operation.

7. In a continuous flow fuel injection system for a multi-cylinder internal combustion engine having an air induction manifold structure for conducting air to each engine cylinder, an adjustable air intake throttle valve for said air induction manifold structure, a fuel metering valve structure means connecting and simultaneously operating said throttle and said metering valve, a source of fuel supply, a fuel pump having an inlet connected with said fuel source and an outlet connected with said metering valve structure, a fuel delivery system connected with said fuel metering valve structure and comprising branch ducts respectively connected with each of said engine cylinder air intakes, an injector nozzle for each of said branch ducts and comprising a coupling structure having a fuel jet intake duct and a discharge passage opening into said engine cylinder air intake, and air inlet means connecting said discharge passage of said nozzle with atmosphere, said air inlet means of said nozzle being about four times greater in cross sectional area than said discharge passage, said discharge passage being about four times greater in cross-sectional area than said fuel jet intake duct and of an area less than that which would supply from said air inlet means all of the idle air requirements of said engine, said intake port discharge passage being constructed of a length operable to produce substantially complete atomization of fuel therein prior to injection into said air induction manifold by reason of siphoning of air by the fuel flow from the fuel jet intake duct into said intake port discharge passage at engine speeds above engine idling operation.

8. In a continuous flow fuel injection system for a multi-cylinder internal combustion engine having an air induction manifold structure for conducting air to each engine cylinder, an adjustable air intake throttle valve for said air induction manifold structure, a fuel metering valve structure means connecting and simultaneously operating said throttle and said metering valve, a source of fuel supply, a fuel pump having an inlet connected with said fuel source and an outlet connected with said metering valve structure, a fuel delivery system connected with said fuel metering valve structure and comprising branch ducts respectively connected with each of said engine cylinder air intakes, an injector nozzle for each of said branch ducts and comprising a coupling structure having a fuel jet intake duct and a discharge passage opening into said engine cylinder air intake, and air inlet means connecting said discharge passage of said nozzle with atmosphere, said fuel jet intake duct axially aligned with said discharge passage, said intake port discharge passage being constructed of a length operable to produce substantially complete atomization of fuel therein prior to injection into said air induction manifold by reason of siphoning of air from said air inlet means by the fuel flow from the fuel jet intake duct directly into said intake port discharge passage at engine speeds above engine idling operation.

9. In a continuous flow fuel injection system for a multi-cylinder internal combustion engine having an air induction manifold structure for conducting air to each engine cylinder, an adjustable air intake throttle valve for said air induction manifold structure, a fuel metering valve structure means connecting and simultaneously operating said throttle and said metering valve, a source of fuel supply, a fuel pump having an inlet connected with said fuel source and an outlet connected with said metering valve structure, a fuel delivery system connected with said fuel metering valve structure and comprising branch ducts respectively connected with each of said engine cylinder air intakes, an injector nozzle for each of said branch ducts and comprising a coupling structure having a fuel jet intake duct and a discharge passage opening into said engine cylinder air intake, and an air inlet means connecting said discharge passage of said nozzle with atmosphere, said fuel jet intake duct axially aligned with said discharge passage, said air inlet means of said nozzle connected at the junction of said fuel jet intake duct with said discharge passage and disposed substantially normal thereto, said intake port discharge passage being constructed of a length operable to produce substantially complete atomization of fuel therein prior to injection into said air induction manifold by reason of siphoning of air from said air inlet means by the fuel flow from the fuel jet intake duct directly into said intake port discharge passage at engine speeds above engine idling operation.

10. In a continuous flow fuel injection system for a multi-cylinder internal combustion engine having an air induction manifold structure for conducting air to each engine cylinder, an adjustable air intake throttle valve for said air induction manifold structure, a fuel metering valve structure means connecting and simultaneously operating said throttle and said metering valve, a source of fuel supply, a fuel pump having an inlet connected with said fuel source and an outlet connected with said metering valve structure, a fuel delivery system connected with said fuel metering valve structure and comprising branch ducts respectively connected with each of said engine cylinder air intakes, an injector nozzle for each of said branch ducts and comprising coupling structure having a fuel jet intake duct and a discharge passage opening into said engine cylinder air intake, and air inlet means connecting said discharge passage of said nozzle with atmosphere, said fuel jet intake duct axially aligned with said discharge passage, said air inlet means of said nozzle connected at the junction of said fuel jet intake duct with said discharge passage and disposed substantially normal thereto, the aforesaid air inlet means comprising a plurality of radial passages, and a screen for said radial passages, said intake port discharge passage being constructed of a length operable to produce substantially complete atomization of fuel therein prior to injection into said air induction manifold by reason of siphoning of air from said air inlet passages by the fuel flow from the fuel jet intake duct into said intake port discharge passage at engine speeds above engine idling operation.

11. In a continuous flow fuel injection system for a multi-cylinder internal combustion engine having an air induction manifold structure for conducting air to each engine cylinder, an adjustable air intake throttle valve for said air induction manifold structure, a fuel metering valve structure means connecting and simultaneously operating said throttle and said metering valve, a source of fuel supply, a fuel pump having an inlet connected with said fuel source and an outlet connected with said metering valve structure, a fuel delivery system connected with said fuel metering valve structure and comprising branch ducts respectively connected with each of said engine cylinder air intakes, an injector nozzle for each of said branch ducts and comprising a coupling structure having a fuel jet intake duct and a discharge passage opening into said engine cylinder air intake, and air inlet means connecting said discharge passage of said nozzle with atmosphere, said air inlet means of said nozzle being about four times greater in cross sectional area than said discharge passage, said discharge passage being about four times greater in cross-sectional area than said fuel jet intake duct and of an area less than that which would supply from said air inlet means all of the idle air requirements of said engine, said intake port discharge passage being constructed of a length operable to produce substantially complete atomization of fuel therein prior to injection into said air induction manifold by reason of siphoning of air from said air inlet means by the fuel flow from the fuel jet intake duct directly into said intake port discharge passage at engine speeds above engine idling operation, the length of said discharge passage being approximately at least six times the diameter thereof.

References Cited in the file of this patent

UNITED STATES PATENTS 2,511,213 Leslie _____ June 13, 1950

FOREIGN PATENTS 149,352 Great Britain _____ July 22, 1920
184,404 Austria _____ Jan. 25, 1956